(12) United States Patent
Nahmias Nanni et al.

(10) Patent No.: US 8,763,658 B2
(45) Date of Patent: Jul. 1, 2014

(54) TYRE COMPRISING AN ELECTRONIC UNIT

(75) Inventors: Marco Nahmias Nanni, Milan (IT); Luisa Montinaro, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 44 days.

(21) Appl. No.: 13/124,065

(22) PCT Filed: Oct. 16, 2008

(86) PCT No.: PCT/EP2008/063982
§ 371 (c)(1),
(2), (4) Date: Jul. 13, 2011

(87) PCT Pub. No.: WO2010/043264
PCT Pub. Date: Apr. 22, 2010

(65) Prior Publication Data
US 2011/0259496 A1    Oct. 27, 2011

(51) Int. Cl.
*B60C 23/04*    (2006.01)
*B60C 25/18*    (2006.01)
*C08K 3/02*    (2006.01)
*C08L 9/00*    (2006.01)
*C08L 23/28*    (2006.01)
*B29D 30/00*    (2006.01)

(52) U.S. Cl.
CPC .............. *C08L 23/283* (2013.01); *C08K 3/02* (2013.01); *B29D 2030/0072* (2013.01); *B60C 23/0493* (2013.01); *C08L 9/00* (2013.01)
USPC ......... 152/152.1; 73/146; 73/146.8; 524/493; 524/496; 525/333.2

(58) Field of Classification Search
CPC  C08L 23/282; C08K 3/02; B29D 2030/0072; B60C 23/0493
USPC ............... 73/146–146.8; 152/152.1; 524/493, 524/496; 525/333.2
IPC .............................................. B60C 23/04,25/18
See application file for complete search history.

(56) References Cited

U.S. PATENT DOCUMENTS

| | | | |
|---|---|---|---|
| 2,356,128 | A | 8/1944 | Thomas et al. |
| 2,631,984 | A | 3/1953 | Crawford et al. |

(Continued)

FOREIGN PATENT DOCUMENTS

| | | |
|---|---|---|
| EP | 0 906 839 A2 | 4/1999 |
| EP | 2 072 291 A2 | 6/2009 |

(Continued)

OTHER PUBLICATIONS

ORings (Hardness, ORings, Inc., 2012, 1 page).*

(Continued)

*Primary Examiner* — Brieann R Fink
(74) *Attorney, Agent, or Firm* — Finnegan, Henderson, Farabow, Garrett & Dunner, L.L.P.

(57) ABSTRACT

A tire having an internal surface includes an electronic device and an anchoring body mounted on the internal surface for engagement between the electronic device and the internal surface of the tire, wherein the anchoring body includes a crosslinked elastomeric material obtained by crosslinking a crosslinkable elastomeric composition including a synthetic diene rubber, preferably in an amount of from 20 to 80 phr, and a halogenated butyl rubber, preferably in an amount of from 80 to 20 phr.

36 Claims, 4 Drawing Sheets

(56) References Cited

U.S. PATENT DOCUMENTS

| | | | |
|---|---|---|---|
| 3,099,644 A | 7/1963 | Parker et al. | |
| 3,968,076 A | 7/1976 | Gessler et al. | |
| 4,068,051 A | 1/1978 | Baldwin et al. | |
| 4,080,491 A * | 3/1978 | Kobayashi et al. | 526/137 |
| 4,294,732 A * | 10/1981 | Ohyachi et al. | 524/271 |
| 4,474,924 A | 10/1984 | Powers et al. | |
| 4,554,326 A | 11/1985 | Kowalski et al. | |
| 4,681,921 A | 7/1987 | Gardner et al. | |
| 4,774,288 A * | 9/1988 | Ridland | 525/133 |
| 5,021,509 A * | 6/1991 | Keller et al. | 525/221 |
| 5,532,312 A | 7/1996 | Gursky et al. | |
| 5,681,901 A | 10/1997 | Newman | |
| 5,804,644 A * | 9/1998 | Nakafutami et al. | 524/572 |
| 5,996,663 A * | 12/1999 | Garro et al. | 152/564 |
| 6,228,929 B1 * | 5/2001 | Larson et al. | 524/495 |
| 7,557,151 B2 * | 7/2009 | Belin et al. | 524/105 |
| 2002/0161118 A1 * | 10/2002 | Scholl et al. | 525/123 |
| 2007/0137752 A1 * | 6/2007 | Agostini et al. | 152/450 |
| 2008/0035259 A1 | 2/2008 | Mancosu et al. | |
| 2009/0151829 A1 * | 6/2009 | Lionetti et al. | 152/152.1 |

FOREIGN PATENT DOCUMENTS

| | | |
|---|---|---|
| WO | WO-2004/110794 A1 | 12/2004 |
| WO | WO 2006099985 A1 * | 9/2006 |
| WO | WO 2007048621 A1 * | 5/2007 |
| WO | WO-2007/121768 A1 | 11/2007 |

OTHER PUBLICATIONS

International Search Report from the European Patent Office for International Application No. PCT/EP2008/063982 (Mail date Jul. 6, 2009).

* cited by examiner

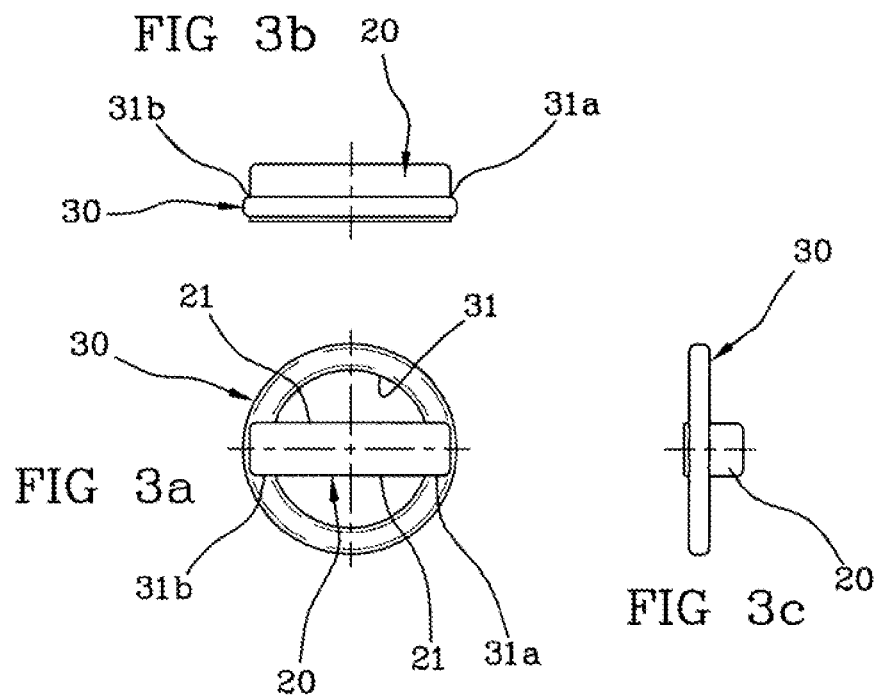
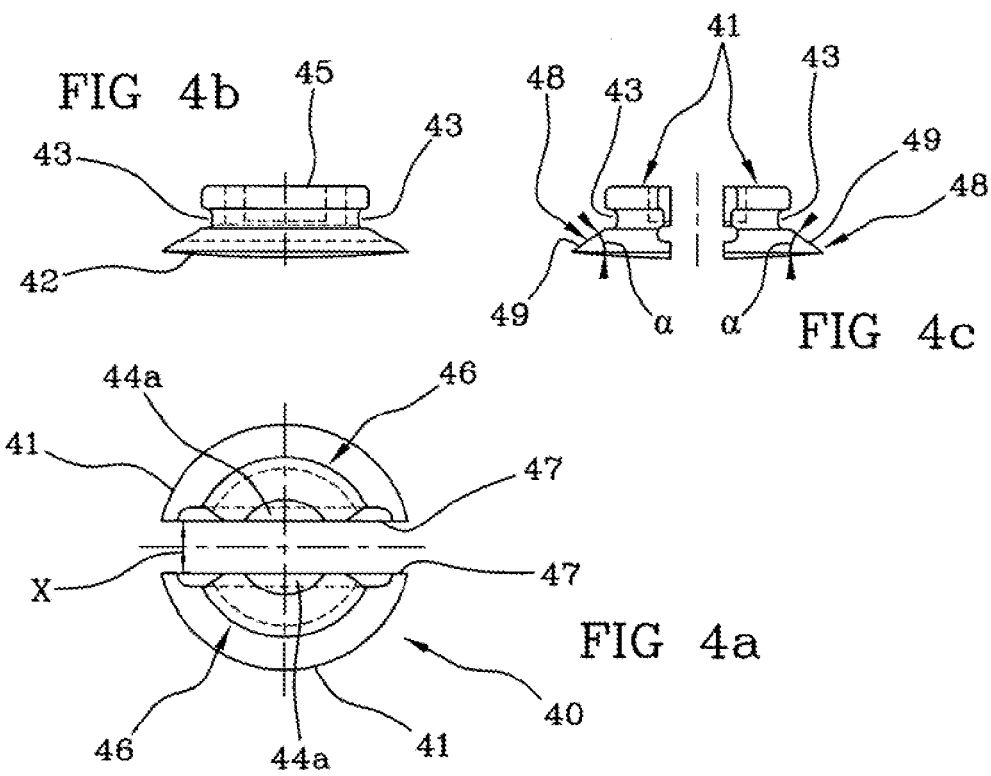

TYRE COMPRISING AN ELECTRONIC UNIT

CROSS REFERENCE TO RELATED APPLICATION

This application is a national phase application based on PCT/EP2008/063982, filed Oct. 16, 2008, the content of which is incorporated herein by reference.

FIELD OF THE INVENTION

The present invention relates to a tyre comprising an electronic device.

More in particular, the present invention relates to a tyre comprising an electronic device and an anchoring body manufactured with a crosslinkable elastomeric composition comprising synthetic diene rubber and halogenated butyl rubber.

BACKGROUND OF THE INVENTION

On some types of vehicles the necessity is felt to monitor the operating conditions of the tyres and to possibly keep traces of the evolution in time of some characteristic operating parameters.

Characteristic parameters that are generally considered may be identification code, temperature, pressure, distance run by the tyre, as well as parameters originating from mathematical calculations or signal processing that can be carried out within the tyre or on board the vehicle.

To this aim, within the tyre an electronic device can be mounted, said electronic device being suitable for obtaining at least one of the above characteristic parameters. Preferably, the electronic device can comprise an electronic unit and an antenna. The electronic unit can comprise at least one sensor, possibly associated with a control unit (such as a microprocessor) and/or a data storage unit. The electronic unit is preferably associated to an antenna, preferably said antenna has the task of enabling radio-frequency signal exchange with the devices mounted on board the vehicle.

In addition, the antenna can allow the system present within the tyre to be suitably powered without using independent powering units (e.g. batteries within the tyre). Therefore, the apparatus mounted on board the vehicle are provided to generate an electromagnetic field with which the antenna placed in the tyre can be coupled by induction, and by virtue of which the necessary energy for operation of the sensor and the possible control unit is supplied by the antenna itself.

EP 906,839 describes a method and apparatus for bonding an electronic monitoring device having electronic and mechanical components for monitoring at least one engineering condition within a tire to a vulcanized rubber patch which is secured to the inner cavity of a tire utilizing a layer of dual cure bonding rubber. The patch may be rubber selected from the group consisting of Ethylene Propylene Diene Monomer (EPDM) rubber, butyl rubber, natural rubber, neoprene and mixtures thereof. One preferred embodiment is a mixture of chlorobutyl rubber and natural rubber. Another preferred embodiment is a mixture of Styrene-Butadiene rubber (SBR) and natural rubber.

WO 2007/121,768 describes an electronic device (10), as illustrated in the Figures, which comprises an electronic unit (20), an antenna (30) connected with the electronic unit (20), and an anchoring body (40) comprising at least two portions (41). The anchoring body (40) is made of an elastomeric material selected from synthetic diene rubbers, natural rubber, ethylene-propylene rubber, ethylene-propylene-diene rubber and the like.

SUMMARY OF THE INVENTION

When an electronic device is applied to the inner portion of the tyre by using an anchoring body to anchor the electronic device to the tyre and the tyre is mounted on a vehicle for normal use, the assembly formed by the electronic device and the anchoring body is subjected to several sources of mechanical stresses during the revolution of the tyre.

One source of mechanical stress is the tremendous centrifugal force which acts on the sensor during the tyre rotation, particularly at high speed. The centrifugal force varies depending on the rotation speed of the tyre and causes compression of the anchoring body, which should absorb such a deformation without ruptures and/or cracks.

Moreover, during acceleration, braking, and/or cornering the assembly is subjected to additional axial and/or longitudinal forces.

Further, during normal use, the portion of the tyre contacting the traveling road is flattened so as to cause a reduction to substantially zero of the centrifugal force at the portion of the tyre being in contact with the road. The reduction of the centrifugal force causes an instantaneous relaxation of the anchoring body which is no more compressed by the action of the centrifugal force.

Accordingly, the assembly is subjected to a cycle of compression and relaxation for each revolution of the tyre. The assembly should resist to such a succession of compression and relaxation forces without ruptures and/or cracks.

Finally, the assembly should be able to last for the whole life of the tyre, e.g., approximately 50,000 kilometers, to avoid to the consumer the need of maintenance operations for the substitution thereof in advance of replacing the tyres.

The Applicant has found that the elastomeric composition of the anchoring body associated with the electronic device plays a major role in the resistance of the assembly to the above mentioned mechanical stresses.

More in particular the Applicant has found that crosslinked elastomeric compositions comprising natural rubber, as described for example in EP 906,839, to realize the anchoring body, is not able to provide the necessary resistance to the above mentioned mechanical stresses.

After a long set of experimentations and tests, the Applicant has found that an assembly comprising an electronic device and an anchoring body (for example like that described in WO 2007/121,768), in which the anchoring body is manufactured with a crosslinkable elastomeric composition comprising synthetic diene rubber (preferably butadiene rubber) and halogenated butyl rubber is able to resist in an effective and durable manner to the above mentioned mechanical stresses.

The Applicant believes that the synthetic diene rubber mixed with a halogenated butyl rubber provides a significant resistance to abrasion to the resulting anchoring body, for efficiently counteracting rubbing between the anchoring body and the electronic device and/or the tyre inner surface, which could cause cracks and/or ruptures in the anchoring body, or malfunctioning in the electronic device.

Moreover, the Applicant has found that the assembly of the present invention is able to last for the whole average life of the tyre without ruptures or cracks of the anchoring body, requiring its substitution.

Further, the Applicant has also found that the assembly according to embodiments of the present invention is able to resist to high speeds of up to 270 km/h without ruptures of the anchoring body.

Moreover, the Applicant has also found that the assembly according to embodiments of the present invention is able to resist to fast accelerations and decelerations up to and from high speed, e.g., as high as 300 km/h, without ruptures of the anchoring body.

In a first aspect, the invention relates to a tyre for vehicle wheels, having an internal surface, comprising an electronic device and an anchoring body mounted on said internal surface for engagement between said electronic device and said internal surface of said tyre. Said anchoring body comprises a crosslinked elastomeric material obtained by crosslinking a crosslinkable elastomeric composition. The crosslinkable elastomeric composition comprises a synthetic diene rubber, preferably in an amount of from 20 to 80 phr, and a halogenated butyl rubber, preferably in an amount of from 80 to 20 phr.

The crosslinkable elastomeric composition preferably comprises from 30 to 70 phr of synthetic diene rubber, and from 70 to 30 phr of halogenated butyl rubber. Even more preferably, the crosslinkable elastomeric composition comprises from 40 to 60 phr of synthetic diene rubber, and from 60 to 40 phr of halogenated butyl rubber.

Preferably, the electronic device comprises an electronic unit and an antenna. Said antenna is connected with said electronic unit.

Preferably. the anchoring body comprises a portion, substantially having a cylindrical shape, with a groove in which the inner perimetral edge of the antenna is fitted.

According to an embodiment, the anchoring body comprises at least two portions. Said electronic unit of said electronic device is preferably arranged between said two portions.

For the purposes of the present description and of the claims which follow, the term "phr" means the parts by weight of a given component of the elastomeric composition per 100 parts by weight of rubber.

Advantageously, the anchoring body is fastened to the inner crown portion of the tyre; in such a case, preferably the main longitudinal extension of the electronic unit is transverse, and in particular substantially perpendicular, to the equatorial plane of the tyre.

The Applicant has observed that the resistance to mechanical stresses is improved when the assembly is fastened to the inner crown portion of the tyre in such a way that the electronic unit is transverse, and in particular perpendicular, to the equatorial plane of the tyre.

In a second aspect, the invention relates to an assembly comprising an electronic device and an anchoring body. Said anchoring body comprises a crosslinked elastomeric material. Said crosslinked elastomeric material is obtained by crosslinking a crosslinkable elastomeric composition comprising a synthetic diene rubber and a halogenated butyl rubber.

The present invention, in at least one of the abovementioned aspects, may show one or more of the preferred characteristics hereinafter described.

Preferred synthetic diene rubbers may be obtained by solution polymerization, emulsion polymerization or gas-phase polymerization of one or more conjugated diolefins. Optionally, the synthetic diene rubbers useful in the present invention can also comprise small amount, of one or more additional comonomer. Said small amount of one or more additional comonomer can be up to 20 or 30% by weight. Said one or more additional comonomer may be, for example, monoalkenes like styrene, ethylene, propylene, isobutylene, vinyl acetate, and acrylonitrile.

The conjugated diolefins generally contain from 4 to 12 carbon atoms. Preferably, conjugated diolefins containing from 4 to 8 carbon atoms are used in the present invention. Preferred conjugated diolefins may be selected, for example, from: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof.

High cis-1,4-polybutadiene rubbers having a 1,4-cis content higher than 70% by weight, preferably higher than 90%, more preferably in the range of from 90% to 98% by weight are also particularly preferred conjugated diolefins.

For example, a high cis-1,4-polybutadiene rubber usable in the present invention is the Synthetic Rubber Buna cis 132 having a 1,4-cis content of about 95% by weight manufactured by Dow Chemical Company.

Preferred halogenated butyl rubbers useful in the present invention may be derived from butyl rubbers by reaction with chlorine or bromine according to methods known in the art. For example, the butyl rubber may be halogenated in hexane diluent, working at a temperature of from 40° C. to 60° C., using bromine or chlorine as the halogenation agent. Preferably, the halogen contents is from 0.1% by weight to 10% by weight, based on the weight of the halogenated butyl rubber. Preferably the halogen contents is from 0.5% by weight to 5% by weight, based on the weight of the halogenated butyl rubber.

According to one preferred embodiment, said butyl rubber may be selected from isobutyl rubbers. Preferably, said isobutyl rubbers may be selected from homopolymers of isoolefin monomer containing from 4 to 12 carbon atoms or copolymers obtained by polymerizing a mixture comprising at least one isoolefin monomer containing from 4 to 12 carbon atoms and at least one conjugated diolefin monomer containing from 4 to 12 carbon atoms. Preferably, said copolymers contain from 70% by weight to 99.5% by weight, based on the hydrocarbon content of the copolymer, of at least one isoolefin monomer. More preferably, said copolymers contain from 85% by weight to 95.5% by weight, based on the hydrocarbon content of the copolymer, of at least one isoolefin monomer. Preferably said copolymers contain from 0.5% by weight to 30% by weight, based on the hydrocarbon content of the copolymer, of at least one conjugated diolefin monomer. More preferably said copolymers contain from 4.5% by weight to 15% by weight, based on the hydrocarbon content of the copolymer, of at least one conjugated diolefin monomer.

Preferably, the isoolefin monomer may be selected from C4-C12 compounds such as, for example, isobutylene, isobutene, 2-methyl-1-butene, 3-methyl-1-butene, 2-methyl-2-butene, methyl vinyl ether, indene, vinyltrimethylsilane, hexene, 4-methyl-1-pentene, or mixtures thereof. Isobutylene is preferred.

Preferably, the conjugated diolefin monomer may be selected from C4-C14 compounds such as, for example, isoprene, 1,3-butadiene, 2,3-dimethyl-1,3-butadiene, myrcene, 6,6-dimethyl-fulvene, hexadiene, cyclopentadiene, piperylene, or mixtures thereof. Isoprene is preferred.

According to one preferred embodiment, the isobutyl rubbers may be selected from copolymers containing from 95% by weight to 99.5% by weight based on the hydrocarbon content of the copolymer of isobutylene and from 0.5% by weight to 5% by weight based on the hydrocarbon content of the copolymer of isoprene.

Further details regarding isobutyl rubbers and the methods for their preparation may be found, for example, in U.S. Pat. No. 2,356,128, U.S. Pat. No. 3,968,076, U.S. Pat. No. 4,474,924, U.S. Pat. No. 4,068,051, or U.S. Pat. No. 5,532,312.

Halogenated butyl rubbers that are particularly preferred according to the present invention are chlorobutyl rubbers, bromobutyl rubbers, or mixtures thereof.

Further details regarding the halogenated butyl rubbers and the methods for their preparation may be found, for example, in U.S. Pat. No. 2,631,984, U.S. Pat. No. 3,099,644, U.S. Pat. No. 4,554,326, U.S. Pat. No. 4,681,921, or U.S. Pat. No. 5,681,901.

Examples of commercially available chlorobutyl and bromobutyl rubbers which may be used in the present invention are the products Chlorobutyl 1240, or Bromobutyl 2030, from Lanxess, and the products Chlorobutyl 1066, or 1068, or Bromobutyl 2222, 2244, or 2255, from Exxon.

Preferably, the crosslinkable elastomeric composition comprises at least one reinforcing filler. Said at least one reinforcing filler may be selected from those commonly used for crosslinked manufactured products. For example, carbon black, silica, alumina, aluminosilicates, calcium carbonate, kaolin, or mixtures thereof are selected. Carbon black, silica and mixture thereof are particularly preferred.

The addition of at least one reinforcing filler, and in particular of carbon black, silica or a mixture thereof, advantageously increases the stress at break and the resistance to fatigue of the anchoring body. In order to obtain such results, a minimum amount of about 10 phr of said at least one reinforcing filler is preferably added to the crosslinkable elastomeric composition. More preferably such minimum amount can be of about 20 phr, still more preferably of about 30 phr. Preferably, said at least one reinforcing filler is added to the crosslinkable elastomeric composition in an amount not higher than about 70 phr, more preferably about 60 phr, still more preferably about 50 phr.

According to one preferred embodiment, said carbon black reinforcing filler may be selected from those having a surface area of not less than 20 $m^2/g$ (determined according to ASTM D6556-07 Standard Test Method for Carbon Black-Total and External Surface Area by Nitrogen Adsorption). More preferably, said carbon black reinforcing filler may be selected from those having a surface area of not less than 30 $m^2/g$. Most preferably, said carbon black reinforcing filler may be selected from those having a surface area of not less than 50 $m^2/g$.

According to one preferred embodiment, said silica reinforcing filler may be selected, for example, from: pyrogenic silica, precipitated amorphous silica, wet silica (hydrated silicic acid), dry silica (anhydrous silicic acid), fumed silica, vegetal silica (i.e., silica obtained from agricultural waste, like rice hulls and rice straw), calcium silicate, or mixtures thereof. Other suitable fillers include aluminum silicate, magnesium silicate, or mixtures thereof. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The BET surface area, as measured according to ASTM D1993-03 Standard Test Method for Precipitated Silica-Surface Area by Multipoint BET Nitrogen Adsorption, gives a measure of the reinforcing character of different silicas.

Silica reinforcing fillers which may be advantageously used preferably have a BET surface area of from about 30 $m^2/g$ to about 400 $m^2/g$, more preferably of from about 100 $m^2/g$ to about 250 $m^2/g$, still more preferably of from about 150 $m^2/g$ to about 220 $m^2/g$.

Examples of silica reinforcing fillers which may be used and are available commercially are the products known by the name of Hi-Sil® 190, Hi-Sil® 210, Hi-Sil® 215, Hi-Sil® 233, Hi-Sil® 243, from PPG Industries (Pittsburgh, Pa.); or the products known by the name of Ultrasil® VN2 and VN2GR, Ultrasil® VN3 and VN3GR, Ultrasil® 7000 GR from Evonik; or the products known under the name of Zeosil® 165GR, 195 MP, 1115 MP, and 1165 MP from Rhodia.

The above mentioned crosslinkable elastomeric composition may be vulcanized according to known techniques, in particular with sulfur-based vulcanizing systems. To this end, in the composition, after one or more steps of thermomechanical processing, a sulfur-based vulcanizing agent is incorporated, preferably together with vulcanization activators and accelerators. In the final processing step, the temperature is generally kept below 120° C. and preferably below 100° C., so as to avoid any unwanted pre-crosslinking phenomena.

The vulcanizing agent most advantageously used is sulfur, or molecules containing sulfur (being sulfur donors), with accelerators, activators and/or retardants known to those skilled in the art.

Said sulfur or derivatives thereof may be selected, for example, from (i) soluble sulfur (crystalline sulfur); (ii) insoluble sulfur (polymeric sulfur); (iii) sulfur dispersed in oil (for example 33% sulfur known under the trade name Crystex® OT33 from Flexsys); (iv) sulfur donors such as, for example, tetrabenzylthiuram disulphide (TBzTD), tetraethylthiuram disulphide (TETD), tetrabutylthiuram disulphide (TBTD), dimethyldiphenylthiuram disulphide (MPTD), pentamethylenethiuram tetrasulphide or hexasulphide (DPTT), morpholinobenzothiazole disulphide (MBSS), dithiodimorpholine (DTM or DTDM), caprolactam disulphide (CLD); or mixtures thereof.

Said sulfur or derivatives thereof are preferably employed in the crosslinkable elastomeric composition in an amount of from about 0.05 phr to about 10 phr. More preferably said sulfur or derivatives thereof are employed in the crosslinkable elastomeric composition in an amount of from about 0.1 phr to about 5 phr. Still more preferably said sulfur or derivatives thereof are employed in the crosslinkable elastomeric composition in an amount of from about 0.2 phr to about 2 phr.

According to a further preferred embodiment, the crosslinkable elastomeric composition may further comprise at least one vulcanization activator.

Vulcanization activators that are particularly effective are zinc compounds. In particular ZnO, $ZnCO_3$, zinc salts of saturated or unsaturated fatty acids containing from 8 to 18 carbon atoms are used. For example zinc stearate is used, which are preferably formed in situ in the elastomeric composition from ZnO and fatty acid, and also MgO, BiO, PbO, $Pb_3O_4$, $PbO_2$, or mixtures thereof.

Said vulcanization activators are preferably employed in the crosslinkable elastomeric composition in an amount of from about 0.5 phr to about 10 phr.

More preferably said vulcanization activators are employed in the crosslinkable elastomeric composition in an amount of from 1 phr to 5 phr. Still more preferably said vulcanization activators are employed in the crosslinkable elastomeric composition in an amount of from 1.5 phr to 3.5 phr.

According to a further preferred embodiment, the crosslinkable elastomeric composition may further comprise at least one vulcanization accelerator.

Vulcanization accelerators that are commonly used may be selected, for example, from: dithiocarbamates, guanidine, thiourea, thiazoles, sulfenamides, thiurams, amines, xanthates, or mixtures thereof.

Said vulcanization accelerators are preferably employed in the crosslinkable elastomeric composition in an amount of from about 0.05 phr to about 10 phr. More preferably said vulcanization accelerators are preferably employed in the crosslinkable elastomeric composition in an amount of from about 0.1 phr to about 5 phr. Still more preferably said vulcanization accelerators are employed in the crosslinkable elastomeric composition in an amount of from about 0.5 phr to about 3 phr.

According to a further preferred embodiment, the crosslinkable elastomeric composition may further comprise at least one anti-reversion agent.

Anti-reversion agents that are commonly used may be selected, for example, from: hexamethylene-1,6-bis(thiosulfate) disodium salt (Duralink HTS, Flexsys), 1,3-bis(citraconimidomethyl)benzene (Perkalink 900, Flexsys), 1,6-bis(N,N'-dibenzylthiocarbamoyldithio)-hexane (Vulcuren KA 9188, Lanxess), or mixtures thereof.

Said anti-reversion agents are preferably employed in the crosslinkable elastomeric composition in an amount of from about 0.1 phr to about 10 phr. More preferably said anti-reversion agents are employed in the crosslinkable elastomeric composition in an amount of from about 0.5 phr to about 5 phr. Still more preferably said anti-reversion agents are employed in the crosslinkable elastomeric composition in an amount of from about 1 phr to about 3 phr.

In particular, the anti-reversion agents provide a more stable cross-linked elastomeric composition which is able to better resist to the high temperatures reached by the anchoring body when fitted on a tyre operating at high speeds.

According to a further preferred embodiment, the crosslinkable elastomeric composition may further comprise at least one antioxidant.

Antioxidants that are commonly used may be selected, for example, from: phenyl-p-phenylenediamine (6-PPD, by Akzo Nobel), penta-erythrityl-tetrakis-(3,5-di-tert-butyl-4-hydroxyphenyl) propionate (Irganox 1010, by Ciba), polymerized 2,2,4-trimethyl-1,2-dihydroquinoline (TMQ, by Chemos), or mixtures thereof.

Said antioxidants are preferably employed in the crosslinkable elastomeric composition in an amount of from about 0.5 phr to about 10 phr. More preferably said antioxidants are employed in the crosslinkable elastomeric composition in an amount of from about 1.0 phr to about 5 phr.

The elastomeric composition may comprise other commonly used additives selected on the basis of the specific application for which the composition is intended. For example, the following may be added to said crosslinkable elastomeric composition: anti-ageing agents, plasticizers, adhesives, antiozonants (in particular of the p-phenylenediamine type), waxes, modifying resins, fibers (for example Kevlar® pulp), or mixtures thereof.

The above mentioned crosslinkable elastomeric composition may be prepared by mixing together the synthetic diene rubber, the halogenated butyl rubber, and the reinforcing filler, together with the other additives optionally present, according to techniques known in the art.

The mixing steps may be carried out, for example, using an open mixer of open-mill type, or an internal mixer of the type with tangential rotors (Banbury) or with interlocking rotors (Intermix), or in continuous mixers of Ko-Kneader type (Buss), or of co-rotating or counter-rotating twin-screw type.

Preferably the minimum IRHD hardness at the temperature of 23° C. of said elastomeric material is about 30. More preferably such minimum IRHD hardness can be 45, still more preferably of about 55. Preferably the IRHD hardness at the temperature of 23° C. of said elastomeric material is not higher than about 80, more preferably about 70, still more preferably about 65.

BRIEF DESCRIPTION OF THE DRAWINGS

Further features and advantages will become more apparent from the detailed description of a preferred, but not exclusive, embodiment of a tyre comprising an assembly in accordance with the present invention. This description will be set out hereinafter with reference to the accompanying drawings, given by way of non-limiting example, in which:

FIG. 3a is a diagrammatic view of the electronic device shown in FIG. 2a;

FIGS. 3b and 3c are diagrammatic side views of the electronic device shown in FIG. 2a;

FIG. 4a is a diagrammatic view of the anchoring body shown in FIG. 2a;

FIGS. 4b and 4c are diagrammatic side views of the anchoring body shown in FIG. 2a.

DETAILED DESCRIPTION OF THE PREFERRED EMBODIMENTS

With reference to the drawings, a tyre for vehicle wheels in accordance with a preferred embodiment of the present invention has been generally denoted by 1.

Tyre 1 can be mounted on any type of vehicle such as motor vehicles or motorcycles; more particularly tyre 1 is preferably set to be used on vehicles that are provided on board with the necessary electronics for co-operating and interacting with the devices housed in the tyre itself and described in the following.

Tyre 1 (FIG. 1) has an internal surface 2 of substantially toroidal conformation; this internal surface 2 can comprise a layer of elastomeric material that is substantially airtight and is usually referred to as "liner".

An electronic device 10 is associated with the internal surface 2 by means of an anchoring body 40.

Figure 2A:
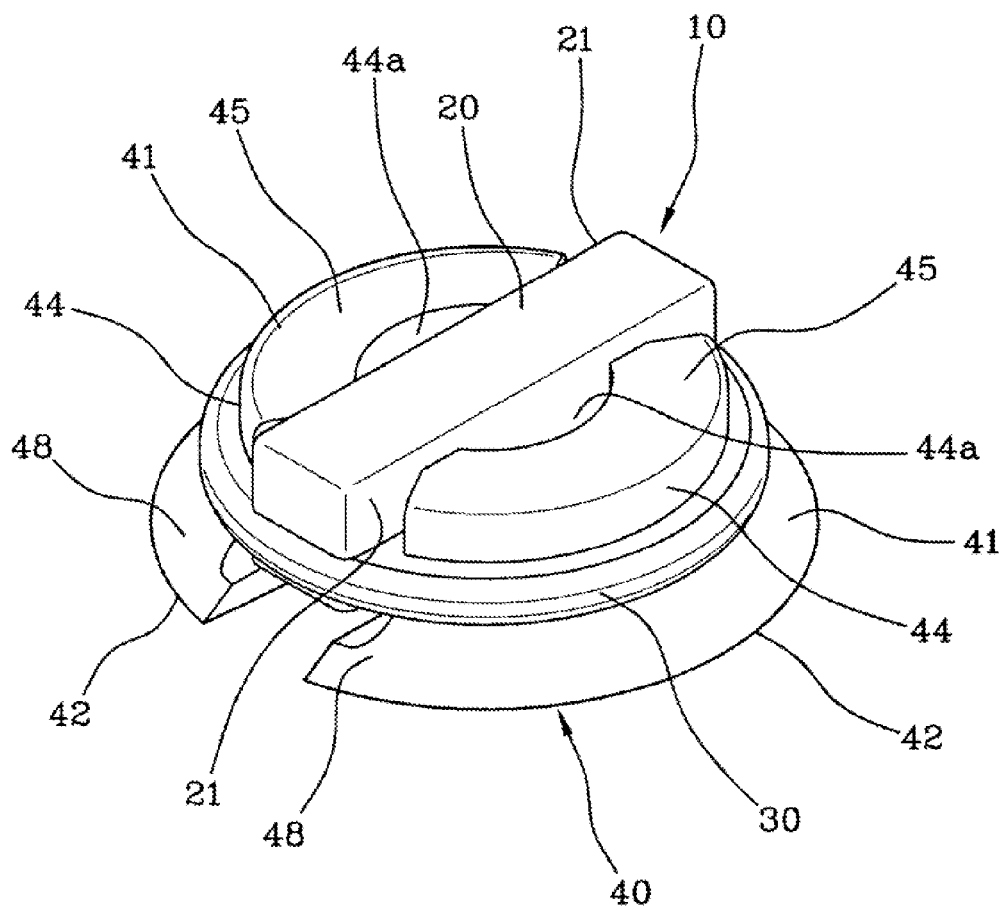
FIG. 2a is a diagrammatic perspective view of an embodiment of the assembly of FIG. 1, comprising an electronic device and an anchoring body.
Figure 2B:
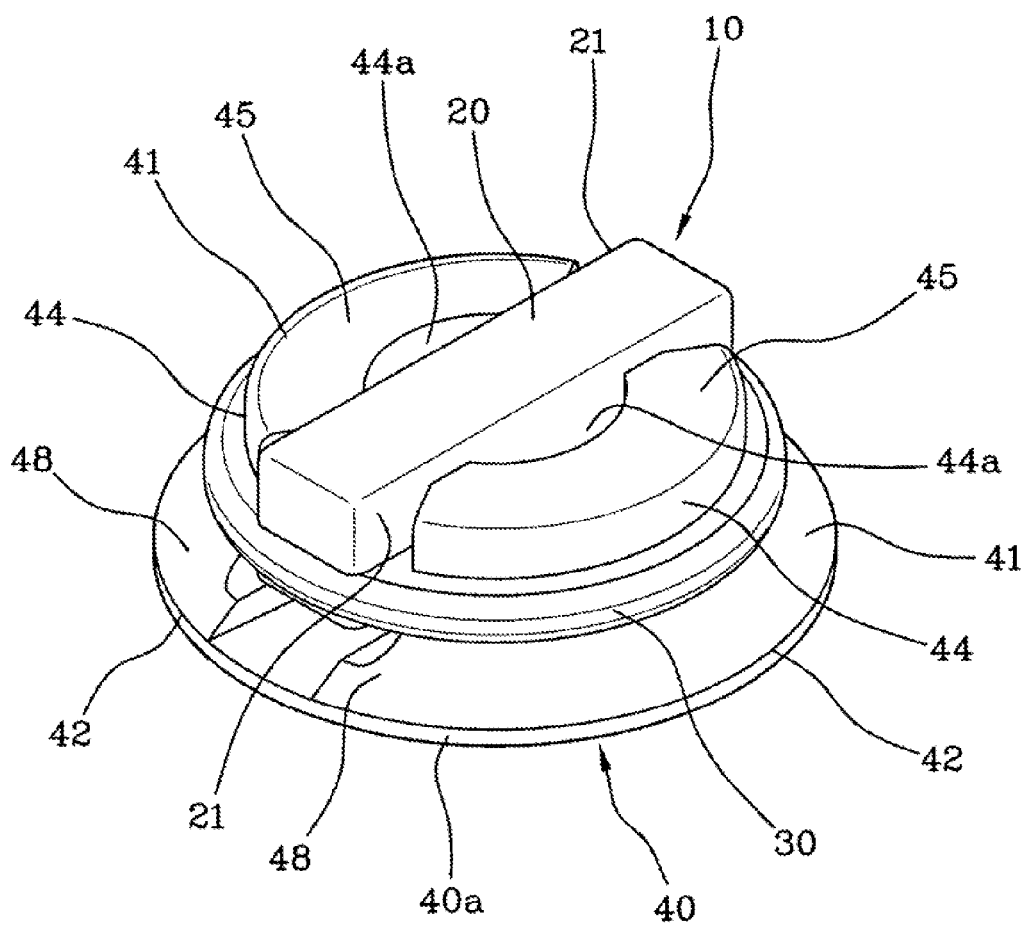
FIG. 2b is a diagrammatic perspective view of another embodiment of the assembly of FIG. 1, comprising an electronic device and an anchoring body.

The electronic device 10 preferably comprises an electronic unit 20 and an antenna 30 (FIG. 2a-2b).

The electronic device 10 preferably has a weight not exceeding 10 g, and preferably in the range of from 2 g to 8 g.

Preferably the electronic unit 20 is adapted to detect operating parameters relating to tyre 1 and/or the operating conditions of the tyre itself.

In particular the electronic unit 20 may comprise one or more sensors to detect said operating parameters which, for example, can be the tyre temperature, inner pressure and/or distance covered, possibly calculated in co-operation with the devices located on board.

The electronic unit 20 can comprise a microprocessor connected to said sensors to manage operation thereof. A storage unit may contain the data detected by the sensors, and/or the operating firmware of the electronic unit.

Preferably stored in the electronic unit 20 (in the storage unit if present) are tyre identification data, to be able to unequivocally identify the tyre during processing and evaluation of the operating parameters mentioned above.

Preferably, the electronic unit 20 is arranged to communicate with an electronic receiving apparatus positioned on board the vehicle. To enable communication between the electronic unit 4 and electronic receiving apparatus on board, an antenna 30 is provided to be operatively associated with the electronic unit 20.

In addition to the above, the antenna 30 can be also utilized to power the electronic unit 20 and the devices associated therewith, by electromagnetic coupling, so as to avoid use of independent powering units within the tyre 1.

Alternatively a power source can be included in the electronic unit. The power source can be a battery, or a device adapted to transform mechanical energy in electrical energy, such as, for example, a piezoelectric element.

Data exchange between the electronic unit 20 and said electronic receiving apparatus takes place through transmission and reception of radio-frequency signals (RF signals) the frequency of which can be included between about 100 kHz and about 50 MHz, and preferably can correspond to about 125 kHz. In particular, this frequency range can be used if feeding of the electronic unit 20 is wished to take place through the antenna 30 itself that in this case would have a configuration of the "closed" type. If on the contrary the antenna is wished to be used for data transmission/reception, also frequencies included between about 300 MHz and about 2.5 GHz (e.g., 433 MHz) can be employed, in which case antennas of a configuration of the "open" type are utilized.

In the present context, an antenna with a configuration of the "open" type means an antenna the configuration of which defines an electrically open circuit. For instance, the antenna body can have one or more ends electrically connected to the detecting unit and one or more "free" ends.

By the expression an antenna with a configuration of the "closed" type it is intended an antenna the conformation of which defines an electrically closed circuit, in which case the antenna body has two ends that are both electrically connected to said detecting unit.

The antenna 30 has an inner perimetral edge 31 which is preferably adapted to engage with the anchoring body 40 that will be disclosed in the following.

Preferably the antenna 30 has a substantially annular shape.

Preferably the antenna 30 has two separate contact areas for connection with the electronic unit 20, i.e. a first contact area 31*a* and a second contact area 31*b*.

In particular the electronic unit 20 has an elongated shape extending along a main longitudinal direction D from the first to the second contact area 31*a*, 31*b* of said antenna 30 (FIGS. 3*a*-3*c*, 4*a*-4*c*).

In the preferred embodiment, the electronic unit 20 is embedded in an enclosure having a substantially prismatic shape, and is preferably in the shape of a parallelepiped.

In case the antenna 30 has an annular shape, and in particular a substantially circular shape, the first and second contact areas 31*a*, 31*b* can be diametrically opposed, so that the electronic unit 20 is arranged along a diameter of said annular shape.

In a preferred embodiment, the antenna 30 comprises a first auxiliary antenna of the open type, and a second auxiliary antenna of the closed type.

For installation of the electronic device 10 within tyre 1, the anchoring body 40 is mounted on the internal surface 2 of said tyre 1.

The anchoring body 40 is made of a crosslinked elastomeric material obtained by crosslinking a crosslinkable elastomeric composition comprising the above described synthetic diene rubber, preferably in an amount of from 20 to 80 phr, and the above described halogenated butyl rubber, preferably in an amount of from 80 to 20 phr.

The crosslinkable elastomeric composition preferably comprises from 30 to 70 phr of synthetic diene rubber, and from 70 to 30 phr of halogenated butyl rubber. Even more preferably, the crosslinkable elastomeric composition comprises from 40 to 60 phr of synthetic diene rubber, and from 60 to 40 phr of halogenated butyl rubber.

Preferably, the anchoring body 40 has a portion, having a substantially cylindrical shape. A groove 43 may be provided, on the external surface of the anchoring body 40, in which the inner perimetral edge 31 of the antenna 30 is fitted.

More preferably, the anchoring body 40 comprises at least two portions 41. Said two portions 41 can be obtained by a section of said anchoring body 40. Said section is created with a plane perpendicular to the base of said anchoring body 40. Each portion 41 has a fastening surface 42, secured to the internal surface 2 of the tyre 1.

Preferably, each portion 41 has a portion having a substantially semi-cylindrical shape. In such a case, the fastening surfaces 42 of the portions 41 define a base of said portion having a cylindrical shape.

Each portion 41 of the anchoring body 40 can have a tapered end 48 in contact with the internal surface 2 of the tyre 1 and diverging towards said internal surface 2; in particular, the angle α defined between the fastening surface 42 of the portion 41 and an external inclined side wall 49 of the tapered end 48 is preferably comprised between 25° and 60°, and more preferably between about 40° and about 50°.

The electronic unit 20 is preferably arranged between the two portions 41. The engagement between the inner perimetral edge 31 of the antenna 30 and the groove 43 of each portion 41 can maintain a constraint between the electronic unit 20 and the anchoring body 40.

Each portion 41 preferably has a retaining portion 44 having a top surface 45 facing away from the fastening surface 42; in a preferred embodiment the groove 43 is formed between the fastening surface 42 and the retaining portion 44.

Preferably, the retaining portion 44 of each portion 41 has a hollow 44*a*, in order to allow an elastic deformation of the same retaining portion 44, so as to facilitate engagement between the antenna 30 and the groove 43.

In other words, the retaining portion 44 can be elastically deformed so that the same retaining portion 44 can be inserted between the electronic unit 20 and the inner perimetral edge 31 of the antenna 30, thereby obtaining the constraint between the electronic unit 20 and the anchoring body 40.

Preferably, each hollow 44*a* faces a respective side wall of the electronic unit 20.

Advantageously each portion 41 has a first side surface 46, on which the groove 43 is formed, and a second side surface 47, at least a portion of which is in contact with electronic unit 20.

In more detail, the portion of the second side surfaces 47 mutually face for engaging the electronic unit 20.

Preferably, the portions 41 are substantially identical to each other.

Preferably, the electronic unit 20 has a couple of side walls 21 substantially parallel to the main longitudinal direction D;

each side wall 21 is at least partly in contact with a respective second side surface 47 of said portions 41.

It is to be noted that the portions 41 of the anchoring body 40 are not in contact with each other, so that a significant mechanical uncoupling of the electronic unit 20 from stresses generated on the same electronic unit 20 by the tyre 1 during running is achieved.

Further, by maintaining a preset distance between the two portions 41, a proper working of the electronic unit 20 is allowed, since sensors and/or transmitting-receiving devices provided therein are not shielded by the elastomeric material of which the portions 41 are made.

It is to be noted that in the description and in the following claims for "diameter", when not referred to a circumference, it is to be intended the maximum overall dimension measured in a plane substantially parallel to the contact surface between the internal surface 2 of the tyre 1 and the anchoring body 40.

Preferably, the diameter of the upper portion of the anchoring body 40, i.e. the portion defined by the retaining portions 44, is comprised between 26 mm and 40 mm, and in particular is comprised between 32 mm and 36 mm.

Preferably, the diameter of the groove 43 is comprised between 20 mm and 35 mm, and in particular is comprised between 23 mm and 30 mm.

Preferably, the diameter of the anchoring body 40 at the contact region with the internal surface 2 of the tyre 1 is comprised between 31 mm and 45 mm, and in particular is comprised between 36 and 40 mm.

Preferably, the ratio between the height of the anchoring body 40 and the height of the electronic unit 20, both measured in a direction perpendicular to the fastening surface 42 and/or to the top surface 45, is greater than one.

Figure 1:
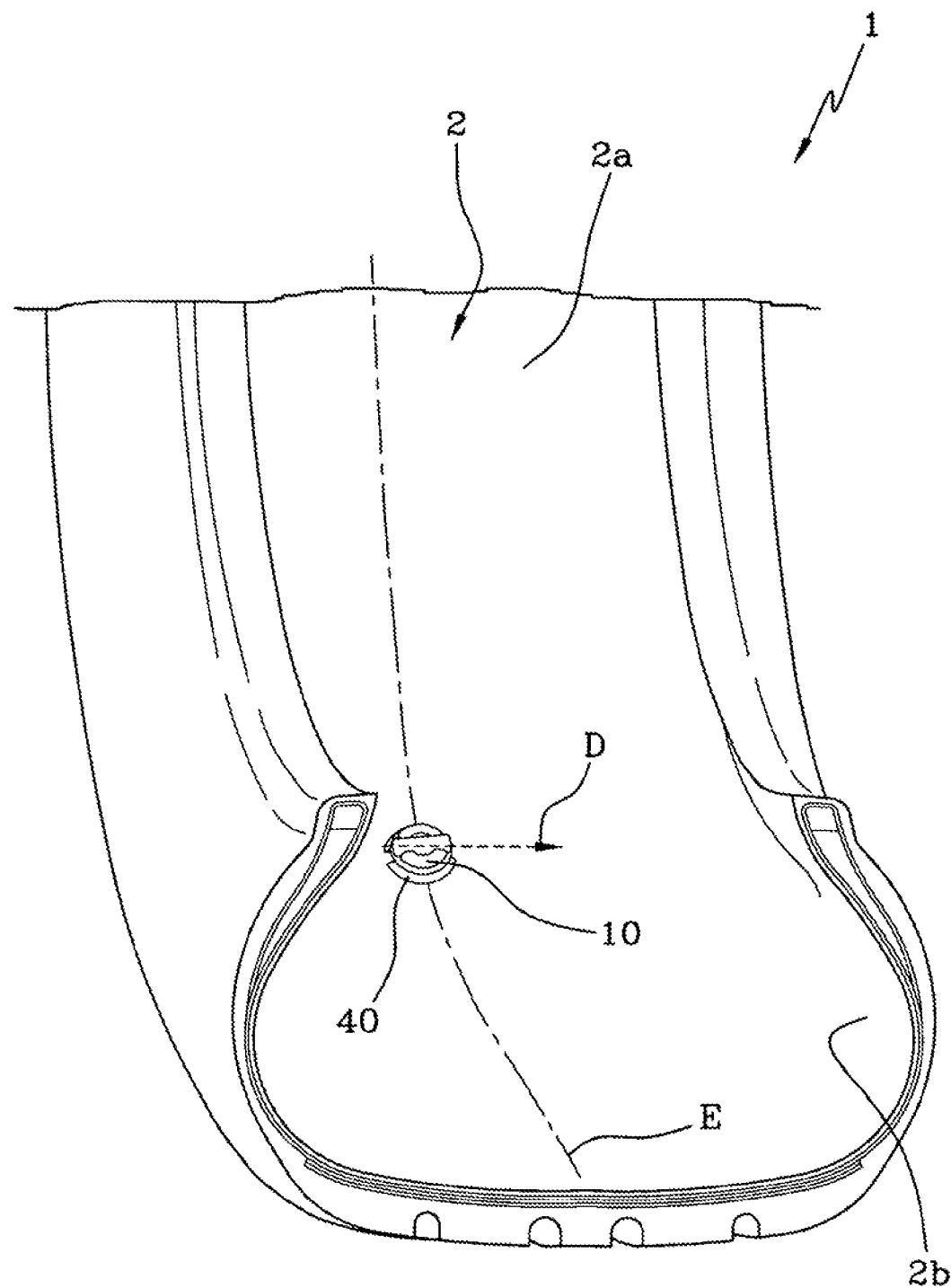
FIG. 1 is a diagrammatic perspective view of a portion of the internal surface of a first embodiment of a tyre in accordance with the invention, on which an assembly is mounted.

In a preferred embodiment, diagrammatically shown in FIG. 1, the electronic unit 20 is mounted on the internal surface 2 (e.g. on the liner 2a) of the tyre 1, and preferably positioned on the equatorial plane E of the same tyre 1; the main longitudinal direction D of the electronic unit 20 is transverse and in particular perpendicular to the equatorial plane E.

In a preferred embodiment (FIG. 2a), the portions 41 are separate from each other.

In such a case, the fastening surface 42 of the portions 41 can be directly in contact with the internal surface 2 of the tyre 1.

In another preferred embodiment (FIG. 2b), the anchoring body 40 further comprises a connection layer 40a, with which the fastening surfaces 42 of the portions 41 are connected.

The portions 41 can be mounted on said connection layer 40a; alternatively, the portions 41 can be integrally made with said connection layer 40a.

Preferably, the connection layer 40a is made of the same material as the portions 41.

In case the connection layer 40a is provided, the portions 41 of the anchoring body 40 are not directly in contact with the internal surface 2 of the tyre 1, the same connection layer 40a being interposed between the portions 41 and the internal surface 2.

It is to be noted that in both embodiments (separate portions and portions connected by the connection layer 40a) a satisfactory mechanical uncoupling between the portions 41 is obtained, and in no case the deformations undergone by the tyre 1 during running are transmitted in a significant manner to the electronic unit 20.

When the electronic unit 20 is to be installed within the tyre 1, the portions 41 are arranged so that the second side surfaces 47 face each other.

The portions 41 are not in contact with each other; in particular, the portions 41 are arranged so that the distance X between the second side surfaces 47 is substantially equal to the dimension of the electronic unit 20 measured in a direction transverse, and preferably perpendicular, to the main longitudinal direction D.

In particular, the fastening surfaces 42 of the portions 41 are secured to the internal surface 2 of the tyre, for example by means of a proper adhesive material. In other terms, the anchoring body 40 is made separately from the tyre 1 and is then fastened to the internal surface 2 of the same tyre 1.

In case the portions 41 are separate portions, the adhesive material is directly applied between the portions 41 and the internal surface 2 of the tyre 1, whereas if the connection layer 40a is provided, such adhesive material is preferably applied between the connection layer 40a and the internal surface 2.

The present invention will be further illustrated below by means of a number of preparation examples of anchoring bodies, which are given for purely indicative purposes and without any limitation of this invention.

The samples of anchoring bodies were evaluated according to the following tests and measurements.

The tensile modulus (50% Modulus, 100% Modulus and 300% Modulus), the tensile strength, as well as the stress at break, the elongation at break and the energy at break, were measured according to Standard ISO 37:2005, on samples of the elastomeric compositions described below, crosslinked at 170° C., for 10 min.

The hardness in IRHD degrees (at 23° C.) according to Standard ISO 48:2007 and the Shore hardness according to ISO 7619-1:2004 were measured on samples of the elastomeric compositions vulcanized at 170° C., for 15 min.

Example 1

Preparation of Electronic Devices 1 to 4

Three sets of tests were performed with electronic devices fitted on different samples of anchoring body, manufactured by crosslinking the crosslinkable elastomeric compositions of the following Table 1.

For the preparation of elastomeric compositions, all the components, except sulfur and accelerators (TBBS), were mixed together in an internal mixer (model Pomini PL 1.6) for about 5 min (1st Step). As soon as the temperature reached 145±5° C., the elastomeric composition was discharged. The sulfur and accelerator (TBBS 80), were then added and mixing was carried out in an internal mixer (model Thermo Haake Rheomix 3000p) for about 5 minutes at a maximum temperature of 100° C. (2nd Step).

TABLE 1

|  | Sample 1 | Sample 2 | Sample 3 | Sample 4 |
|---|---|---|---|---|
| SMR20 | 50.00 | — | — | — |
| BR | — | 50.00 | 50.00 | 50.00 |
| Cl IIR | 50.00 | 50.00 | 50.00 | 50.00 |
| CB 660 | 40.00 | 40.00 | — | — |
| CB 326 | — | — | 40.00 | 40.00 |
| Silica | — | — | 5.00 | 9.00 |
| Stearic acid | 2.00 | 2.00 | 2.00 | 2.00 |
| Struktol 40 MS | 3.00 | 3.00 | 3.00 | 3.00 |
| ZnO | 4.38 | 4.38 | 4.38 | 4.38 |
| 6PPD | 0.50 | 0.50 | 0.50 | 0.50 |

TABLE 1-continued

|  | Sample 1 | Sample 2 | Sample 3 | Sample 4 |
|---|---|---|---|---|
| TBBS 80 | 1.00 | 1.00 | 1.00 | 1.00 |
| Sulfur | 1.40 | 1.40 | 1.40 | 1.40 |

SMR 20: Standard Malaysian Rubber (Lee Rubber Group);
BR: Solution prepared high-cis polybutadiene (CIS 132-B.S.L. Dow);
Cl IIR: Chloro butyl rubber (Chlobutyl 1066-Exxon);
CB 660: Carbon black N660, surface area about 33 $m^2$/g (Cabot);
CB 326: Carbon black N326, surface area about 78 $m^2$/g (Cabot);
Silica: Ultrasil VN3 (Evonik Degussa);
Struktol 40 MS: Mixture of dark aromatic hydrocarbon resins (Struktol Company);
ZnO: Rhenogran ZnO 80, (Rhein Chemie)
6PPD: Phenyl-p-phenylenediamine (Santoflex 6PPD-Flexsys);
TBBS 80: Rhenogran TBBS 80 (Rhein Chemie);

All the samples were evaluated as described above and the results were summarized in the following Table 2.

TABLE 2

|  | Sample 1 | Sample 2 | Sample 3 | Sample 4 |
|---|---|---|---|---|
| STATIC MECHANICAL PROPERTIES | | | | |
| 50% Modulus (MPa) | 0.85 | 0.88 | 1.00 | 1.30 |
| 100% Modulus (MPa) | 1.44 | 1.47 | 1.60 | 2.19 |
| 300% Modulus (MPa) | 5.20 | 5.14 | 5.23 | 6.65 |
| Tensile strength (MPa) | 10.32 | 9.89 | 11.70 | 9.53 |
| Elongation at break (%) | 574.61 | 603.46 | 637.25 | 456.17 |
| Hardness IRHD (23° C.) | 50.8 | 51.1 | 55.5 | 60.6 |
| Energy (J/cm3) | 26.739 | 28.83 | 34.37 | 21.08 |

A first set of tests was performed by using electronic devices fitted on anchoring bodies made with the elastomeric compositions according to samples. The anchoring bodies were sealed to the inner crown surface of respective Pirelli P7 205/55 R16 tyres The electronic unit had the main longitudinal extension of the electronic unit perpendicular to the equatorial plane of the tyre. A commercial 1300L glue, manufactured by 3M Company was employed to seal each anchoring body to the inner surface of the tyre.

The tyre was mounted on a proper rim, inflated to a pressure of 3.0 bar, and subjected to a high speed test.

Another set of tyres including the assemblies as above was subjected to a fast high speed test.

A further set of tyres including the assemblies as above was subjected to a fatigue test.

The high speed test consisted in starting the rotation of the tyre at 170 km/h for 10 minutes, and then increasing the speed of 10 km/h for each subsequent period of time of 5' up to the end speed, up to 300 km/hour. A load of 500 kg was applied to the tyre during rotation to simulate the load under working conditions.

The fast high speed test consists in starting the rotation of the tyre at 100 km/h within 30 seconds, further increasing the rotation of the tyre up to 300 km/h within 50 seconds, then reducing the speed to 0 km/h within 80 seconds, and repeating such a cycle for five times.

The fatigue test consists in continuously rotating the tyre at 120 km/h for 440 hours, simulating a drive length of about 50.000 kilometers. A load of 400 kg was applied to the tyre during rotation to simulate the load under working conditions.

A camera mounted inside the tyre allowed to verify the integrity and/or the rupture of the electronic device during the tests.

During the high speed test a check was made at the end of each period at constant speed. During the fast high speed test a check was made at the end of each cycle. During the fatigue test a check was made after 140 hours, after 255 hour and at the end of test.

The results of the tests are summarized in the following Table 3.

TABLE 3

|  | Sample 1 | Sample 2 | Sample 3 | Sample 4 |
|---|---|---|---|---|
| High speed test | | | | |
| Maximum speed without ruptures (km/h) | 200 | 230 | 250 | 270 |
| Fast high speed test | | | | |
| Rupture | Yes | Yes | No | No |
| Fatigue test | | | | |
| 140 hours | OK | OK | OK | OK |
| 255 hours | KO | OK | OK | OK |
| 440 hours | KO | KO | OK | OK |

The data of Table 3 clearly show the improvement of the present invention. In the high speed test, the samples 2, 3 and 4 of the present invention allowed to reach 230 km/h, 250 km/h and 270 km/h, respectively, without any rupture or crack in the electronic device. On the contrary, the comparison sample 1, comprising natural rubber, resisted only up to the speed of 200 km/h.

Last, but not least, the fatigue test demonstrated that the samples 3 and 4 of the present invention can last for the whole useful life of a tyre (OK), while comparison sample 1 was damaged (KO) before reaching the completion of the test. Even if sample 2 was not able to reach the end of fatigue test, it showed a significant improvement with respect to sample 1. The best results obtained with samples 3 and 4 appears to be due to the use of CB326, a carbon black having a higher surface area and a finer average grain size than CB660, giving a better improvement to the resistance (stress at break) to ruptures and fatigue.

Example 2

Preparation of Electronic Devices 5 to 9

A further set of high speed tests was performed as described above for Example 1, except that the anchoring body was manufactured by crosslinking the crosslinkable elastomeric compositions according to the samples (5 to 9) reported on the following Table 4.

TABLE 4

|  | Sample 5 | Sample 6 | Sample 7 | Sample 8 | Sample 9 |
|---|---|---|---|---|---|
| SMR20 | — | — | 50.00 | — | — |
| BR | 70.00 | — | 50.00 | 50.00 | 50.00 |
| Cl IIR | 30.00 | 100.00 | — | 50.00 | 50.00 |
| CB 326 | 40.00 | 40.00 | 40.00 | 40.00 | 40.00 |
| Silica | 5.00 | 5.00 | 5.00 | 5.00 | 5.00 |
| Stearic acid | 2.00 | 2.00 | 2.00 | 2.00 | 2.00 |
| Struktol 40 MS | 3.00 | 3.00 | 3.00 | 3.00 | 3.00 |
| ZnO | 4.38 | 4.38 | 4.38 | 4.38 | 4.38 |
| 6PPD | 0.50 | 0.50 | 0.50 | 0.50 | 0.50 |
| TMQ | — | — | — | — | 2.00 |
| HTS | — | — | — | 2.00 | 2.00 |
| BCB | — | — | — | 1.00 | 1.00 |

TABLE 4-continued

|  | Sample 5 | Sample 6 | Sample 7 | Sample 8 | Sample 9 |
|---|---|---|---|---|---|
| TBBS 80 | 1.00 | 1.00 | 1.00 | 1.00 | 1.00 |
| Sulfur | 1.40 | 1.40 | 1.40 | 1.40 | 1.40 |

SMR 20: Standard Malaysian Rubber (Lee Rubber Group);
BR: Solution prepared high-cis polybutadiene (CIS 132-B.S.L. DOW);
Cl IIR: Chloro butyl rubber (Chlobutyl 1066-Exxon);
CB 326: Carbon black N326 (Cabot);
Silica: Ultrasil VN3 (Evonik Degussa);
Struktol 40 MS: Mixture of dark aromatic hydrocarbon resins (Struktol Company);
ZnO: Rhenogran ZnO 80, (Rhein Chemie);
6PPD: Phenyl-p-phenylenediamine (Santoflex 6PPD, Flexsys);
TMQ: Polymerized 2,2,4-trimethyl-1,2-dihydroquinoline (TMQ, Chemos)
HTS: Hexamethylene-1,6-bis(thiosulfate) disodium salt,(Duralink HTS, Flexsys)
BCB: 1,3-Bis(citraconimidomethyl)benzene (Perkalink 900, Flexsys)
TBBS 80: Rhenogran TBBS 80 (Rhein Chemie);

All the samples were evaluated as described above and the results were summarized in the following Table 5.

TABLE 5

|  | Sample 5 | Sample 6 | Sample 7 | Sample 8 | Sample 9 |
|---|---|---|---|---|---|
| STATIC MECHANICAL PROPERTIES | | | | | |
| 50% Modulus (MPa) | 1.17 | 0.93 | 1.08 | 1.13 | 1.23 |
| 100% Modulus (MPa) | 1.89 | 1.52 | 1.76 | 1.84 | 2.06 |
| 300% Modulus (MPa) | 6.31 | 6.01 | 6.54 | 7.24 | 6.78 |
| Tensile strength (MPa) | 10.17 | 12.3 | 16.3 | 11.58 | 9.37 |
| Elongation at break (%) | 484.26 | 567.2 | 605.09 | 457.70 | 426.89 |
| Hardness IRHD (23° C.) | 59.1 | 54.7 | 57.6 | 60.1 | 62.3 |
| Energy (J/cm3) | 22.76 | 30.81 | 40.86 | 22.70 | 18.82 |

The results of the high speed tests are summarized in the following Table 6.

TABLE 6

|  | Sample 5 | Sample 6 | Sample 7 | Sample 8 | Sample 9 |
|---|---|---|---|---|---|
| Maximum speed without ruptures (km/h) | 250 | 200 | 200 | 270 | 300 |

Samples 8 and 9 were further subjected to the fatigue test as described in Example 1. Both samples 8 and 9 reached the end of test (440 hours) without any damage or crack.

The invention claimed is:

1. A tyre having an internal surface comprising:
   an electronic device; and
   an anchoring body mounted on said internal surface and configured to engage and enclose said electronic device at a distance away from said internal surface of said tyre,
   wherein said anchoring body comprises a crosslinked elastomeric material obtained by crosslinking a crosslinkable elastomeric composition comprising 50 to 80 phr of a synthetic diene rubber and 20 to 50 phr of a halogenated butyl rubber,
   wherein the sum of the amount of the synthetic diene rubber and the halogenated butyl rubber essentially consists of 100 phr,
   wherein said anchoring body is fastened on said internal surface by means of an adhesive material, and
   wherein said synthetic diene rubber is a high cis-1,4-polybutadiene rubber having a 1,4-cis content higher than 70% by weight.

2. The tyre according to claim 1, wherein said synthetic diene rubbers are obtained by polymerization of one or more conjugated diolefins.

3. The tyre according to claim 2, wherein said conjugated diolefin is selected from 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, and mixtures thereof.

4. The tyre according to claim 1, wherein said halogenated butyl rubber is derived from butyl rubbers by reaction with chlorine or bromine.

5. The tyre according to claim 4, wherein said halogenated butyl rubber comprises a halogen content of 0.1% by weight to 10% by weight, based on the weight of the halogenated butyl rubber.

6. The tyre according to claim 4, wherein said butyl rubbers are isobutyl rubbers selected from homopolymers of an isoolefin monomer containing from 4 to 12 carbon atoms and copolymers of at least one isoolefin monomer containing from 4 to 12 carbon atoms with at least one conjugated diolefin monomer containing from 4 to 12 carbon atoms.

7. The tyre according to claim 6, wherein said isoolefin monomer is selected from isobutylene, isobutene, 2-methyl-1-butene, 3-methyl-1-butene, 2-methyl-2-butene, methyl vinyl ether, indene, vinyltrimethylsilane, hexene, 4-methyl-1-pentene, and mixtures thereof.

8. The tyre according to claim 6, wherein said conjugated diolefin monomer is selected from isoprene, 1,3-butadiene, 2,3-dimethyl-1,3-butadiene, myrcene, 6,6-dimethyl-fulvene, hexadiene, cyclopentadiene, piperylene, and mixtures thereof.

9. The tyre according to claim 1, wherein said crosslinkable elastomeric composition comprises at least one reinforcing filler.

10. The tyre according to claim 9, wherein said reinforcing filler is selected from carbon black, silica and mixtures thereof.

11. The tyre according to claim 10, wherein said carbon black reinforcing filler has a surface area higher than 20 m$^2$/g.

12. The tyre according to claim 11, wherein said carbon black reinforcing filler has a surface area higher than 50 m$^2$/g.

13. The tyre according to claim 9, wherein said crosslinkable elastomeric composition comprises about 10 phr to about 70 phr of said at least one reinforcing filler.

14. The tyre according to claim 1, wherein said crosslinkable elastomeric composition comprises at least one sulfur-based vulcanizing agent.

15. The tyre according to claim 14, wherein said crosslinkable elastomeric composition comprises about 0.05 phr to about 10 phr of said sulfur-based vulcanizing agent.

16. The tyre according to claim 1, wherein said crosslinkable elastomeric composition comprises at least one vulcanization activator.

17. The tyre according to claim 16, wherein said crosslinkable elastomeric composition comprises about 0.5 phr to about 10 phr of said vulcanization activator.

18. The tyre according to claim 1, wherein said crosslinkable elastomeric composition comprises at least one vulcanization accelerator.

19. The tyre according to claim 18, wherein said crosslinkable elastomeric composition comprises about 0.05 phr to about 10 phr of said vulcanization accelerator.

20. The tyre according to claim 1, wherein said crosslinkable elastomeric composition comprises at least one anti-reversion agent.

21. The tyre according to claim 20, wherein said crosslinkable elastomeric composition comprises about 0.1 phr to about 10 phr of said anti-reversion agent.

22. The tyre according to claim 1, wherein said crosslinkable elastomeric composition comprises at least one antioxidant.

23. The tyre according to claim 22, wherein said crosslinkable elastomeric composition comprises about 0.5 phr to about 10 phr of said antioxidant.

24. The tyre according to claim 1, wherein said elastomeric material has an IRHD hardness at a temperature of 23° C. of between about 30 and about 80.

25. The tyre according to claim 1, wherein said anchoring body comprises at least one portion having substantially cylindrical shape with a groove.

26. The tyre according to claim 25, wherein said anchoring body comprises at least two portions.

27. The tyre according to claim 26, wherein portions are substantially identical to each other.

28. The tyre according to claim 26, wherein said portions are separate portions.

29. The tyre according to claim 1, wherein said electronic device comprises an electronic unit connected to an antenna.

30. The tyre according to claim 29, wherein said electronic unit has an elongated shape extending along a main longitudinal direction which is substantially perpendicular to an equatorial plane of said tyre.

31. The tyre according to claim 29, wherein engagement of said antenna and at least two portions of said anchoring body maintains a constraint between said electronic unit and said anchoring body.

32. The tyre according to claim 29, wherein said antenna has a substantially annular shape.

33. The tyre according to claim 29, wherein said antenna has an inner perimetral edge fitting with a groove located on an external surface of said anchoring body, and said electronic unit is arranged between portions of said anchoring body.

34. An assembly, comprising:
an electronic device; and
an anchoring body, comprising at least two retaining portions configured to engage and enclose said electronic device at a distance away from the internal surface of a tyre;
wherein said anchoring body comprises a crosslinked elastomeric material obtained by crosslinking a crosslinkable elastomeric composition comprising 50 to 80 phr of a synthetic diene rubber and 20 to 50 phr of a halogenated butyl rubber,
wherein the sum of the amount of the synthetic diene rubber and the halogenated butyl rubber essentially consists of 100 phr, and
wherein said synthetic diene rubber is a high cis-1,4-polybutadiene rubber having a 1,4-cis content higher than 70% by weight.

35. The assembly according to claim 34, wherein said anchoring body comprises at least one portion having substantially cylindrical shape with a groove.

36. The assembly according to claim 34, wherein said electronic device comprises an electronic unit connected to an antenna.

* * * * *